United States Patent
Warner

[15] 3,655,221
[45] Apr. 11, 1972

[54] ADJUSTABLE TRAILER HITCH
[72] Inventor: Richard E. Warner, 1530 Edgewood Drive, Lodi, Calif. 95240
[22] Filed: Jan. 26, 1970
[21] Appl. No.: 5,447

[52] U.S. Cl..........................................280/490, 280/406 A
[51] Int. Cl..............................................................B60d 1/02
[58] Field of Search ......................................280/490, 406 A

[56] References Cited

UNITED STATES PATENTS

| | | | |
|---|---|---|---|
| 3,269,751 | 8/1966 | Whattoff | 280/482 |
| 3,400,949 | 9/1968 | Kendall | 280/490 |
| 2,847,232 | 8/1958 | Graham | 280/490 |
| 3,434,735 | 3/1969 | Bernard | 280/490 X |

Primary Examiner—Leo Friaglia
Attorney—Townsend and Townsend

[57] ABSTRACT

Apparatus for use in the connection between two vehicles for adjustment to different heights to attain desired levels of each vehicle without prewelding. The apparatus includes a device for selectively positioning a trailer hitch at any one of a number of different levels on a tow vehicle so that the hitch can be properly located for connection with a hitch on a trailer to be towed. The device includes a first member having a pair of spaced, grooved sides between which is removably received a second, ribbed member removably received between the grooved sides of the first member. Pin means is used to connect the first and second members together, the sides of the first member extending up and down so that the second member can be received at different heights above the ground.

9 Claims, 13 Drawing Figures

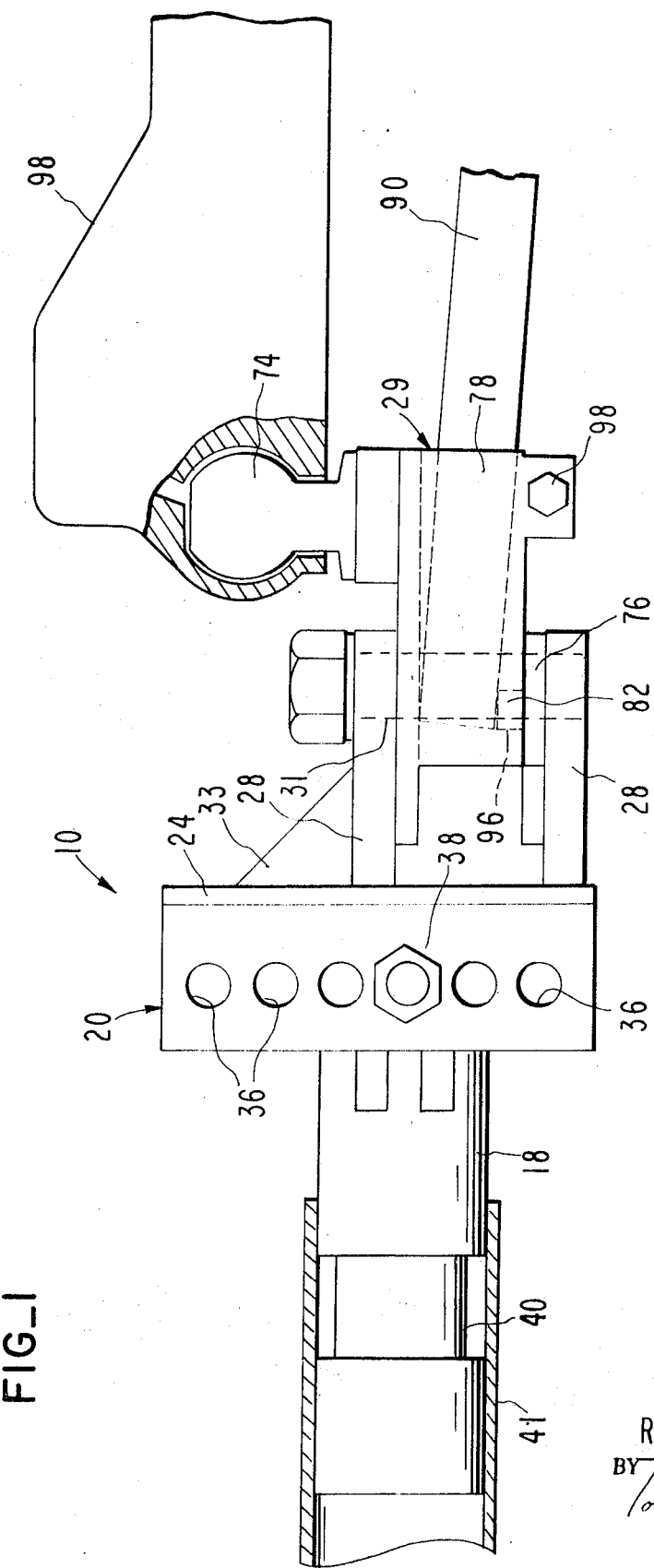

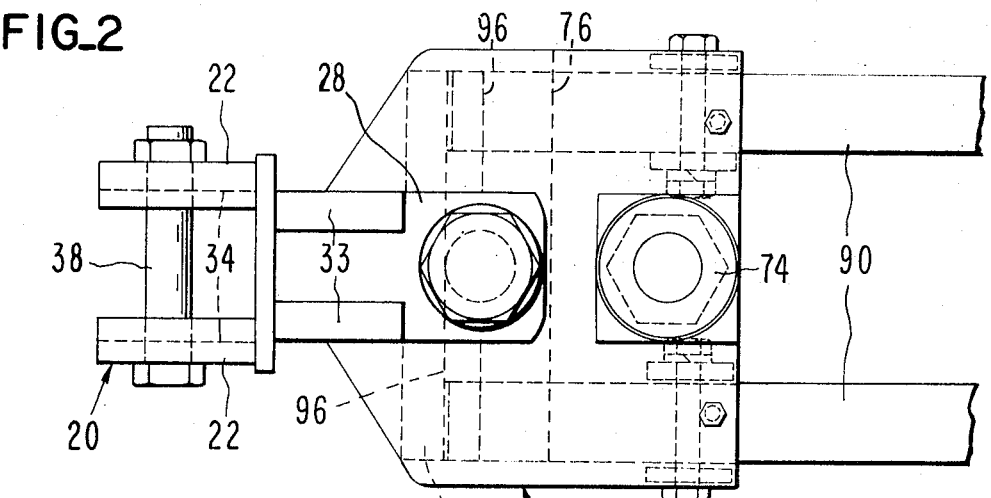
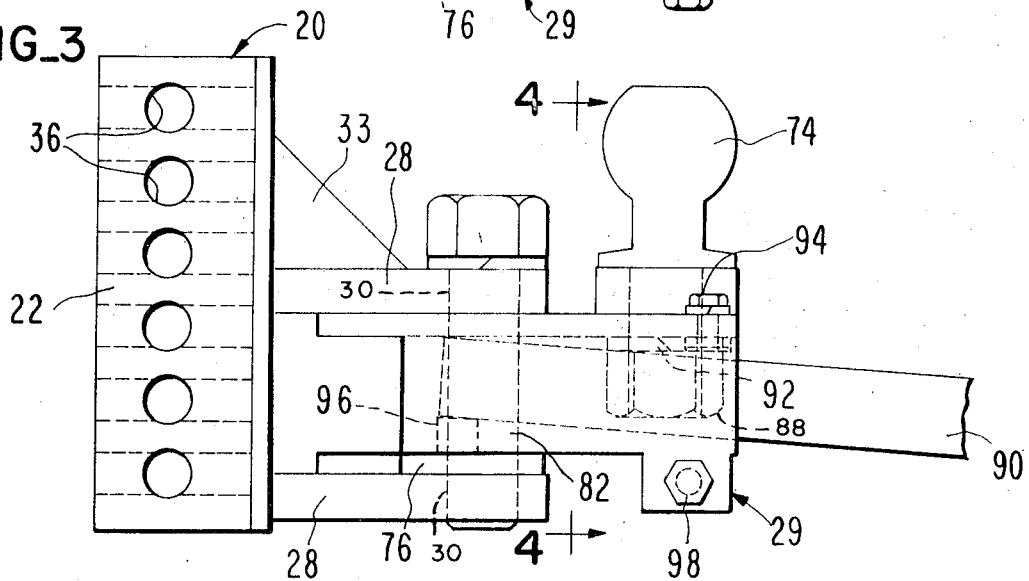
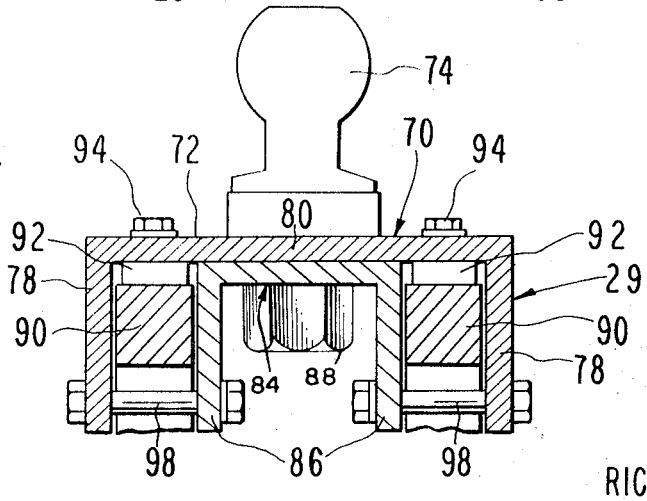
INVENTOR.
RICHARD E. WARNER
BY
Townsend and Townsend
ATTORNEYS

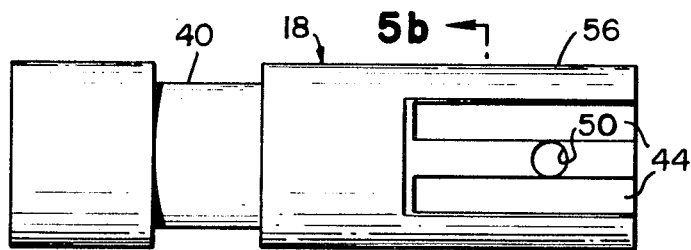
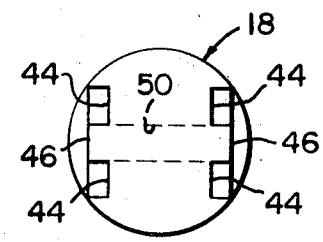
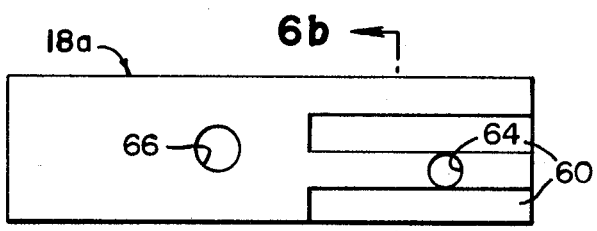
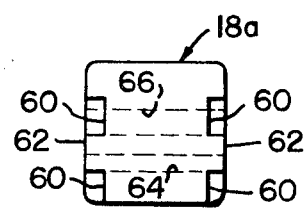
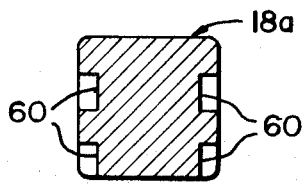
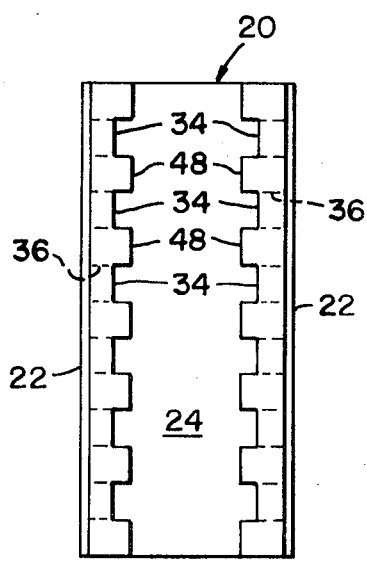
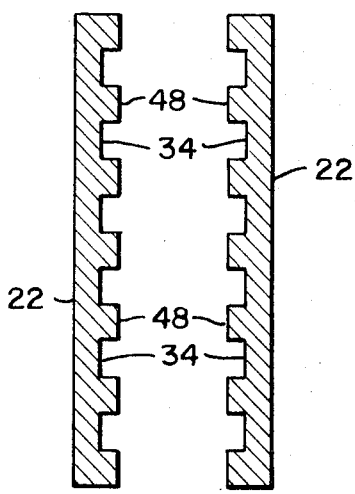
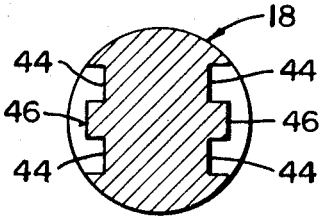
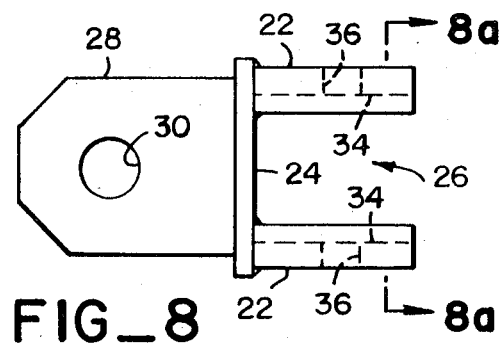
INVENTOR.
RICHARD E. WARNER
BY Townsend and Townsend
ATTORNEYS

ADJUSTABLE TRAILER HITCH

This invention relates to improvements in hitch structures for vehicles and, more particularly, to apparatus for adjusting the height of a trailer hitch on a tow vehicle so that it is at the same height as the hitch tongue on a trailer to be towed.

The present invention is directed to a means for use in connection of two vehicles or equipment for adjustment in different heights to attain desired levels of each without prewelding for all types of trailing connections. To this end, the invention provides hitch apparatus for interconnecting two vehicles, such as an automobile and a trailer, wherein one vehicle has its hitch mounting structure at a different height above ground level from that of the other vehicle. This situation can be due to several reasons and it gives rise to interconnection problems because of the way conventional hitches are constructed. One reason why the situation arises is because different types of trailers have mounting structures or tongues which are constructed differently so as to provide height variations between the tongues of different trailer types. Tongue heights generally vary from 22 inches to 10 inches above ground.

Another reason for this problem is that a towing vehicle could have a rear end area which is below the normal height above ground due, for instance, to a faulty rear suspension system or to an excessive load carried at the rear end. For a two-wheel trailer, the interconnection between the trailer and a towing vehicle can be made with a conventional hitch but the trailer will be undesirably tilted forwardly or rearwardly if there is a height difference between the hitch mounting structures of the vehicles. For a four-wheel trailer, it may not be possible to make an interconnection with a conventional hitch without actually changing the position of the hitch mounting structure on one of the vehicle. This can prove costly and time consuming and is an inconvenience as well.

New car manufacturers are now considering the provision of hitch structure as standard equipment, such structure possibly being in the form of a tube secured to the underside of the vehicle and having a rear end whose location above ground would be determined by the height of the rear bumper above ground level. Since bumper heights can vary between different makes of cars, the above-mentioned problem would arise in this situation.

The hitch of the present invention is constructed in a manner to overcome the problems mentioned above with conventional hitches and is especially suitable for use in the field of load equilization and weight distributing hitch connections. To this end, the invention utilizes an elongated, vertically disposed first member having a hitch ball thereon and provided with means for selectively receiving a second member at any one of a number of operative positions along the vertical length of the first member. The second member will generally be carried by a towing vehicle. Once the second member is received in an operative position by the first member, the two are then interconnected in some suitable manner, such as by pin means so that the first member is prevented from separating from the second member while being maintained at a predetermined height above ground and thereby be in a position to permit the tongue of a vehicle to be towed to be connected to the hitch ball of the first member. Since the first member can be adjustably positioned on the second member, the tongue of the vehicle to be towed can be at a different height above ground from the hitch mounting structure of the towing vehicle. Thus, regardless of this height difference, the two vehicles can be readily interconnected to avoid having to preweld the first and second members together to accommodate the height of the hitch ball to the tongue of the vehicle to be towed.

The hitch of this invention permits interconnection between vehicles whose hitch mounting structures vary in heights within a relatively wide range whose lower limit is a relatively small value, such as about one-half inch. Thus, the hitch can be used universally with many different types of vehicles to be interconnected.

The primary object of this invention is, therefore, to provide improvements in vehicle hitch structures which provide for compensation for differences in the heights between the hitch mounting structures of two vehicles and allows the vehicles to be readily interconnected without prewelding of the hitch ball portion of a hitch to the hitch mounting structure of a tow vehicle.

Another object of this invention is to provide apparatus for use in connecting two vehicles together wherein a first member is provided for selectively receiving a second member at any one of a number of operative locations along a vertical length of the first member so that a hitch ball carried by the first member can be adjustably positioned relative to ground level so as to be located to be properly connected to the tongue of a vehicle to be towed.

A further object of this invention is to provide an apparatus of the aforesaid character wherein the first member has a pair of opposed, vertical sides provided with a plurality of transverse grooves therein for receiving tongues on the outer surface of the second member so that the grooves on the first member define a number of operative positions along its vertical length at which the second member can selectively be received and maintained when the members are coupled together and are connected to respective vehicles.

Other objects of this invention will become apparent as the following specification progresses, reference being had to the accompanying drawings for illustrations of several embodiments of the hitch.

In the drawings:

FIG. 1 is a side elevational view of the apparatus of this invention showing its use with a hitch mounting structure of a tow vehicle and a ball-receiving tongue of a vehicle to be towed;

FIG. 2 is a top plan view of a portion of the apparatus when separated from the hitch mounting structure of a tow vehicle;

FIG. 3 is a side elevational view of the portion shown in FIG. 2;

FIG. 4 is a cross-sectional view taken along line 4—4 of FIG. 3;

FIG. 5 is a side elevational view of one form of a pintle for attachment to the hitch mounting structure of a tow vehicle;

FIG. 5a is an end elevational view of the pintle of FIG. 5;

FIG. 5b is a cross-sectional view taken along lines 5b—5b of FIG. 5;

FIG. 6 is another form of the pintle;

FIG. 6a is an end elevational view of the pintle of FIG. 6;

FIG. 6b is a cross-sectional view taken along line 6b—6b of FIG. 6;

FIG. 7 is a front elevational view of the member for receiving the pintle;

FIG. 8 is a bottom plan view of the member of FIG. 7; and

FIG. 8a is a cross-sectional view taken along lines 8a—8a of FIG. 8.

The apparatus of this invention is broadly denoted by the numeral 10 and is shown in an operative position in FIG. 1 for interconnecting a tow vehicle with a trailer or vehicle to be towed. The apparatus is adapted to be used in all vehicle hitch applications and especially for applications where the hitch mounting structure on the tow vehicle is at a different elevation above the ground from the hitch mounting structure on the vehicle to be towed. The locations of the hitch mounting structures on the corresponding vehicles are generally fixed since they are usually welded or otherwise rigidly attached to the frames of the vehicles. Trailer hitch 10 allows the vehicles to be readily interconnected notwithstanding the vertical misalignment of their hitch mounting structure relative to each other.

Apparatus 10 includes a first member or pintle receiver 20 and a second member or pintle 18 which is removably received within the first member. One form of the pintle, shown in FIGS. 5, 5a and 5b is transversely circular while a second form of the pintle, FIGS. 6, 6a and 6b, is transversely square. Member 20 is formed from a pair of elongated sides 22 which are substantially parallel and are interconnected by a plate 24, whereby the first member has a transversely U-shaped configuration (FIGS. 2 and 8) with an open front 26 (FIG. 8) for receiving the pintle. Open front 26 is open throughout the length of sides 22, whereby pintle 18 can be inserted into member 20 at any one of a number of different locations along its length.

A pair of projections 28 are secured to the rear face of plate 24 and extend laterally therefrom in spaced relationship to each other. Projections 28 are exposed to receive a ball-carrying structure 29 therebetween, the structure being secured to projections 28 by a pin 31 extending through openings 30 aligned with a corresponding opening through structure 29. A pair of webs 33 interconnects the upper projections 28 with the rear face of plate 24 for strength purposes.

Each side 22 has a number of generally parallel grooves 34 therein on the inner surface thereof, the grooves of one side being in substantially horizontal alignment with the corresponding grooves of the other side as shown in FIGS. 7 and 8a. The grooves extend transversely of the length of first member 20, such length being sufficient to provide a relatively side latitude in the variations between the locations at which the pintle is received within member 20. The length can be selected as desired but, for purposes of illustration, it is in the range of 8 inches to 12 inches.

Each side 22 has a plurality of holes 36 therethrough, the holes being in alignment with corresponding grooves 34 as shown in FIG. 7. These holes are provided to receive a pin 38 for interconnecting member 20 and pintle 18 when the latter is disposed at any one of a number of operative locations between sides 22, the pin being receivable through a pair of aligned holes 38 corresponding to the location which the pintle is disposed.

The pintle of FIG. 5, denoted by the numeral 18, is generally cylindrical in configuration and has an annular groove 40 adjacent to one end thereof to facilitate mounting the pintle on the hinge mounting structure 41 of a tow vehicle, structure 41 being in the nature of a cylindrical tube which receives the front end of pintle 18. A pin or other suitable structure (not shown) carried by mounting structure 41 extends into groove 40 to interconnect pintle 18 and structure 41 while allowing the pintle to rotate in the tube.

The rear end of pintle 18 is flattened on opposed sides thereof and is provided with a pair of grooves 44 in each flattened side. Each pair of grooves 44 defines a tongue 46 therebetween. When the pintle is inserted in first member 20, tongues 46 on opposite sides of the pintle enter corresponding, aligned grooves 34 of sides 22. Similarly, grooves 34 define tongues 48 on the inner surfaces of sides 22, tongues 48 being receivable in grooves 44 of pintle 18. For purposes of illustration, the grooves and tongues are transversely rectangular and the tongues are complemental to the grooves.

Pintle 18 also has a hole 50 therethrough which is alignable with a pair of holes 36 when the pintle is disposed in first member 20. Thus, pin 38 can extend through the first member and the pintle and thereby interconnect the same.

When pintle 18 is disposed in pin member 20, the convex upper and lower portions 56 and 58 of the pintle on opposite sides of the flattened portions are disposed between side members 22 and are of dimensions so as not to interfere with the placement of the pintle in member 20. The rotatable mounting of pintle 18 in structure 41 permits the pintle to rotate and thereby allow a slight rolling movement of the tow vehicle relative to the vehicle to be towed.

The second embodiment of the pintle, denoted by the numeral 18a, has a generally square cross section and is also provided with a pair of grooves 60 on each flat side thereof for defining a tongue 62 for insertion into a groove 34 of member 20 when the pintle is received between sides 22 of member 20. Pintle 18a has a hole 64 therethrough for receiving pin 38 when the hole is aligned with corresponding holes 36 in sides 22. A second hole 66 in pintle 18a is used for coupling the same to hitch mounting structure on the tow vehicle, such mounting structure being in the form of a square tube having a pair of aligned holes therethrough for mounting a connecting pin through hole 66 to thereby interconnect the mounting structure and pintle 18a.

Structure 29 shown in FIGS. 2, 3 and 4 includes a first inverted U-shaped body 70 having an upper surface 72 on which is disposed a hinge ball 74. A bottom plate 76 interconnects the bottom margins of the sides 78 of body 70 adjacent to the forward end thereof. The crosspieces 80 of body 70 and plate 76 are provided with aligned holes therethrough for receiving a connecting pin 82 when the latter extends through holes 30 of projections 28 on member 20 and when body 70 is disposed between projections 28 as shown in FIG. 3. Thus, hinge ball 74 is removably connected to first member 20 rearwardly thereof and in a position to be coupled to a ball-receiving tongue on a vehicle to be towed in a manner to be described.

Structure 29 further includes a second inverted U-shaped body 84 having a pair of sides 86 which are spaced inwardly from sides 78 as shown in FIG. 4. The crosspiece 88 of body 84 is secured in any suitable manner to the underside of crosspiece 80, such as by welding or by bolt means. Sides 78 and 86 define a pair of spaces for receiving respective equalizing bars 90 which form a part of the load equalizing and weight distribution structure of the tongue of a vehicle to be towed. The spaces formed by sides 78 and 86 extend forwardly to the regions on opposite sides of pin 82 so that equalizing bars 90 can extend into such spaces in the manner shown in FIGS. 2 and 3.

The inclination of bars 90 can be controlled by the insertion of spacers or shims 92 between the lower surface of crosspiece 80 and the upper surfaces of corresponding bars 90. Bolts 94 are used to hold the shims in place. Spacers 92 inhibit the upward movement of bars 90, the forward ends of the bars resting on a fulcrum block 96 (FIGS. 2 and 3). Each side 86 and the adjacent side 78 are interconnected by bolt 98 as shown in FIG. 4. The rear ends of bars 90 are connected to the vehicle to be towed in a manner such that the load of the vehicle is equalized and its weight properly distributed.

In use, apparatus 10 is connected between a tow vehicle and a vehicle to be towed. As shown in FIG. 1, the tube defining hitch mounting structure 41 will be rigidly secured to the rear of the tow vehicle and located so that pintle 18 can be inserted in the tube. Then, member 20 is coupled to pintle 18 at the desired height determined by tongue 98 of the vehicle to be towed. When the proper height of member 20 relative to pintle 18 is determined, member 20 is inserted on pintle 18 so that tongues 46 are received within a respective pair of grooves 34 of member 20.

After pintle 18 has been received between sides 22 of first member 20 at the proper location, pin 38 is inserted into the aligned holes and can be releasably secured in place by a suitable fastener, such as a nut or the like. Structure 29 can then be connected to the rear end of member 20 such as by the use of pin 82. In the alternative, structure 29 may be connected to member 20 before the latter receives pintle 18.

When properly connected to member 20, structure 29 positions hitch ball 74 at a location to be inserted into the ball-receiving recess of tongue 98. The tongue is provided with means (not shown) for making releasable connection to the hitch ball to thereby prevent removal of the tongue therefrom. Also, bars 90 are inserted into the spaces defined by sides 78 and 86 (FIG. 4) in a manner such that the bars are held at predetermined inclinations and cooperate with tongue 98 to equalize the load and distribute the weight of the vehicle to be towed. When tongue 98 is connected to the hitch ball, the interconnection between the vehicles is complete and movement of the vehicles together as a unit can commence.

Apparatus 10 is suitable for use with vehicles whose hitch mounting structures are at different levels above the ground. For instance, apparatus 10 can be used with the tow vehicle having a structure 41 and with a vehicle to be towed whose tongue is at a different height above ground than tongue 98. In such a case, member 20 will be manipulated relative to pintle 18 so that hitch ball 74 is at the proper height to receive the new tongue. This is accomplished by removing pin 38, then separating member 20 from pintle 18, moving member 20 in a vertical direction until hitch ball 74 is at the proper height for the tongue of the vehicle to be towed, following which, member 20 is then again moved onto pintle 18 at the new operative location and pin 38 is inserted to releasably interconnect the pintle and member 20. Then, the tongue of the vehicle to be towed can then be connected to the hitch ball in the manner described above.

When not in use, apparatus 10 can be removed from the tow vehicle and stored until ready for use again. It can be made inexpensively with a minimum number of parts and it can be constructed to provide sufficient strength to withstand excessive pull forces on it due to the heavy load of a trailer behind it.

Pintle 18, shown in FIG. 5, has grooves 44 symmetrically located between the top and bottom extremities thereof. Thus, the minimum variation in the height between the hitch mounting structures of two vehicles which can be accommodated by pintle 18 will be the distance between the center lines of grooves 44 on one side of pintle 18. For instance, this distance may be one inch; thus, the minimum distance between the hitch mounting structures of the two vehicles will be 1 inch.

Pintle 18a permits a smaller variation to be accommodated because groove 60 on each side of the pintle is adjacent to the bottom face of the pintle. The opening 66 through pintle 18a is symmetrically located. Thus, even though there is a distance of, for instance, one inch between the center lines of groove 60 on one side of pintle 18a, the pintle can be used when the hitch mounting structures of two vehicles are one-half this distance, or approximately one-half inch. This is accomplished by inverting pintle 18a so that the bottom face then becomes the top face of the pintle to accommodate the minimum variation in height of approximately one-half inch.

The present invention, therefore, provides an apparatus for use in the connection of two vehicles together and permits adjustment in different heights to attain desired levels of the mounting structures of two vehicles without prewelding of the apparatus.

I claim:

1. A trailer hitch comprising: a pintle adapted to be coupled in a generally horizontal position to a first vehicle, an elongated receiver having a generally vertically disposed open end and adapted to be connected to a second vehicle, said receiver and said pintle having cooperating tongue and groove means thereon to permit the pintle to be inserted into the receiver through said open end and removably retained therein at any one of a number of operative locations along the length thereof, and means engageable with the receiver and the pintle for interconnecting the same when the pintle is at any one of said operative locations.

2. A trailer hitch as set forth in claim 1, wherein said receiver has a pair of opposed, spaced generally vertical sides defining the open end, the grooves of said structure extending across substantially the entire widths of said sides.

3. A trailer hitch as set forth in claim 1, wherein said pintle is disposed transversely of the length of said receiver when the pintle is inserted therein, said cooperating means including structure extending across substantially the entire width of the receiver for restraining the pintle against movement along said receiver length.

4. Apparatus for interconnecting a pair of vehicles comprising: a first, elongated generally vertically disposed member having a generally vertically disposed open end and means thereon for coupling the same to a first vehicle; a second member adapted to be coupled to a second vehicle, said first member having means defining a plurality of spaced generally horizontal grooves transversely of the length thereof and extending substantially to said open end, the second member being receivable through said open end into said first member and having means defining tongue structure insertable into any one of a number of groups of said grooves when the second member is received in the first member to thereby removably restrain the second member against movement in a direction longitudinally of the first member; and means engageable with the members for interconnecting the same when the second member is received in the first member.

5. Apparatus for interconnecting a pair of vehicles comprising: a first, elongated member having a pair of spaced, generally vertical sides and adapted to be coupled to a vehicle to be towed; a second, elongated, generally horizontal member adapted to be coupled to a tow vehicle, said first member having an open, longitudinally extending front defining an entry for the insertion of the second member between the sides of the first member at any one of a number of operative locations along the same; tongue and groove structure on the members for restraining the second member against movement longitudinally of the first member when the second member is between said sides; and means for interconnecting the first and second members when the second member is at any one of said locations within the second member.

6. Apparatus for interconnecting a pair of vehicles comprising: a first, elongated member having a pair of spaced sides and adapted to be coupled to a vehicle to be towed; a second, elongated member adapted to be coupled member a two vehicle, said first member having an open, longitudinally extending front defining an entry for the insertion of the second member between the sides of the first member at any one of a number of operative locations along the same, said sides having a plurality of spaced grooves therein, there being a groove on one side aligned with a groove on the other side, said second member having a pair of tongues receivable within any one of the pairs of grooves for restraining the second member against movement longitudinally of the first member when the second member is between said sides; and a pin removably extending through one of the members and into the other member for interconnecting the members when the second member is at any one of said locations along the first member.

7. Apparatus for interconnecting a pair of vehicles comprising: an elongated U-shaped member having a pair of spaced sides and a plate interconnecting the sides; hitch ball means on said plate for interconnecting the same to the ball-receiving tongue of a vehicle to be towed; a pintle adapted to be coupled to a tow vehicle and having a pair of tongues on opposite side margins thereof, said U-shaped member having an open, longitudinally extending front defining an entry for the insertion of the pintle between said sides at any one of a number of operative locations along the same, there being a number of pairs of grooves on the inner surfaces of said sides, said tongues extending longitudinally of the pintle and being receivable within any one of the pairs of grooves of said sides for restraining the pintle against movement longitudinally of the U-shaped member when the pintle is between said sides; and means for interconnecting said member when the second member is at any one of said locations within the second member.

8. Apparatus as set forth in claim 7, wherein said pintle is cylindrical in configuration and has a pair of flattened portions on opposed sides thereof, said tongues being formed in said flattened portions.

9. Apparatus as set forth in claim 7, wherein said pintle is transversely square to define a pair of opposed, flat sides, the tongues being formed in said flattened portions.

* * * * *